United States Patent
Freitag et al.

(10) Patent No.: US 7,270,854 B2
(45) Date of Patent: Sep. 18, 2007

(54) METHOD FOR FORMING A HEAD HAVING IMPROVED SPIN VALVE PROPERTIES

(75) Inventors: James Mac Freitag, San Jose, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 284 days.

(21) Appl. No.: 10/717,128

(22) Filed: Nov. 19, 2003

(65) Prior Publication Data
US 2005/0106330 A1 May 19, 2005

(51) Int. Cl.
*C23C 14/00* (2006.01)

(52) U.S. Cl. .................... 427/523; 427/131; 427/132

(58) Field of Classification Search ................ 427/528, 427/127, 131, 132
See application file for complete search history.

(56) References Cited

U.S. PATENT DOCUMENTS

| | | | | |
|---|---|---|---|---|
| 5,055,318 | A * | 10/1991 | Deutchman et al. | 427/534 |
| 6,063,244 | A | 5/2000 | Pinarbasi | 204/192.11 |
| 6,086,727 | A | 7/2000 | Pinarbasi | 204/192.11 |
| 6,208,492 | B1 * | 3/2001 | Pinarbasi | 360/324.11 |
| 6,306,266 | B1 * | 10/2001 | Metin et al. | 204/192.12 |
| 6,317,299 | B1 * | 11/2001 | Pinarbasi | 360/324.11 |
| 6,381,105 | B1 * | 4/2002 | Huai et al. | 360/314 |
| 6,404,606 | B1 | 6/2002 | Pinarbasi | 360/324.11 |
| 6,413,380 | B1 | 7/2002 | Pinarbasi | 204/192.11 |
| 6,417,999 | B1 * | 7/2002 | Knapp et al. | 360/322 |
| 6,437,950 | B1 * | 8/2002 | Chau et al. | 360/324.11 |
| 6,466,419 | B1 * | 10/2002 | Mao | 360/324.12 |
| 6,754,051 | B2 * | 6/2004 | Ishiwata | 360/319 |
| 6,776,883 | B2 * | 8/2004 | Ju et al. | 204/192.34 |
| 6,785,102 | B2 * | 8/2004 | Freitag et al. | 360/324.11 |
| 6,800,565 | B2 * | 10/2004 | Hu et al. | 438/758 |
| 6,856,493 | B2 * | 2/2005 | Pinarbasi | 360/324.11 |
| 6,876,527 | B2 * | 4/2005 | Gill | 360/324.12 |
| 6,954,344 | B2 * | 10/2005 | Cyrille et al. | 360/324.12 |
| 2002/0048127 | A1 | 4/2002 | Fukuzawa et al. | 360/324.1 |

(Continued)

FOREIGN PATENT DOCUMENTS

JP 9069211 3/1997

(Continued)

OTHER PUBLICATIONS

Lee, W. Y. et al., "Effects of Mn Concentration and Deposition Temperature on the Giant Magnetoresistive Properties of Ion-Beam-Deposited PtMn Spin Valves", IEE Transactions on Magnetics, vol. 38, No. 5, Sep. 2002, pp. 3536-3539.

(Continued)

*Primary Examiner*—Bret Chen
(74) *Attorney, Agent, or Firm*—Zilka-Kotab, PC

(57) ABSTRACT

A method for forming a magnetic head having an improved PtMn layer, including forming a PtMn layer by ion beam deposition, forming an antiparallel (AP) pinned layer structure above the PtMn layer, and forming a free layer above the AP pinned layer structure. The method provides a spin valve structure having improved soft magnetic properties of the free layer as well as increases the dR/R of spin valve structures in which implemented.

13 Claims, 7 Drawing Sheets

U.S. PATENT DOCUMENTS

2002/0085320 A1     7/2002    Gill .................... 360/324.11
2003/0035253 A1     2/2003    Lin et al. ................ 360/324
2003/0235016 A1*   12/2003   Gill .................... 360/324.12
2005/0141145 A1*    6/2005    Gill ...................... 360/324.1

FOREIGN PATENT DOCUMENTS

JP          11-144956      5/1999

OTHER PUBLICATIONS

Sant, S. et al.. "Giant Magnetoresistance in Ion Beam Deposited Spin-Valve Films with Specular Enhancement", Journal of Applied Physics, vol. 89, No. 11, Jun. 1, 2001, pp. 6931-6933.

Office Action Summary from application No. 11/112,031 mailed on May 18, 2007.

* cited by examiner

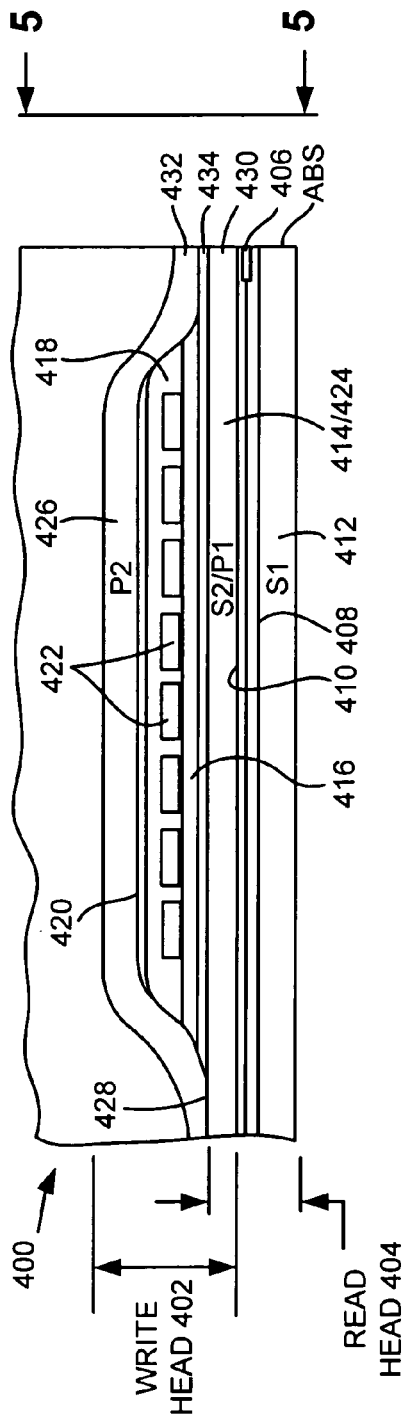
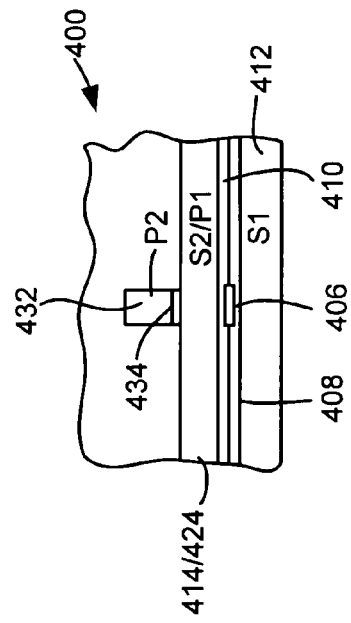
FIG. 4
FIG. 5

US 7,270,854 B2

METHOD FOR FORMING A HEAD HAVING IMPROVED SPIN VALVE PROPERTIES

FIELD OF THE INVENTION

The present invention relates to magnetic heads, and more particularly, this invention relates to read heads having a new seed layer structure that improves signal and/or pinned layer stability.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1 shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

One type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-pinned structure reduces the net moment of the pinned layer, and therefore enhances the effectiveness of the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 222 and a second ferromagnetic layer 226 separated by an antiparallel coupling layer (APC) 224 of nonmagnetic material. The two ferromagnetic layers 222, 226 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

Furthermore, prior art AP-Pinned SV sensors use an AFM in order to pin the pinned layer magnetization. Most commonly used AFM materials have blocking temperatures (temperature at which the pinning field reaches zero Oe) near 200° C. This means that if the temperature of the SV sensor approaches this temperature, the pinned layer magnetization can change its orientation resulting in degraded SV sensor performance.

Although AP-Pinned SV sensors have large effective pinning fields because near cancellation of the magnetic moments of the two sub-layers results in a low net magnetic moment for the pinned layer, thermal stability is still a concern because the operating temperatures of these SV sensors in disk files can exceed 120° C. In addition, the AP-pinned layer structure is vulnerable to demagnetization during processing operations such as lapping.

Therefore there is a need for an SV sensor that increases the magnetic saturation of the pinned layer and reduces the sensitivity to demagnetizing fields particularly at the front and rear edges of the pinned layer stripe. In SV sensors that include AFM layers to provide exchange anisotropy fields to fix the pinned layer magnetization direction, there is a further need for an SV structure that reduces the temperature limitations imposed by the blocking temperature characteristics of the commonly used antiferromagnetic materials required in prior art SV sensors for providing pinning fields.

In any of the prior art sensors described above, the thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dR/R where dR is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

The transfer curve of a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as:

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

Another factor that can affect readback asymmetry is positive magnetostriction of the free layer structure. If the free layer structure has positive magnetostriction and is subjected to compressive stress, there will be a stress-induced anisotropy that urges the magnetic moment of the free layer from the aforementioned position parallel to the ABS toward a position perpendicular to the ABS. The result is readback asymmetry. The compressive stress occurs after the magnetic head is lapped at the ABS to form the stripe height of the sensor of the read head. After lapping, the free layer is in compression and this, in combination with positive magnetostriction, causes the aforementioned readback asymmetry. It is interesting to note that if the free layer structure has negative magnetostriction in combination with compressive stress that the magnetic moment of the free layer is strengthened along the position parallel to the ABS. A high negative magnetostriction, however, is not desirable because it makes the magnetic moment of the free layer structure stiff and less responsive to field signals from the rotating magnetic disk. Accordingly, it is desirable that the magnetostriction of the free layer be zero or only slightly negative.

Thus, soft magnetic properties of spin valve structures are critical especially with thinner free layers. Enhancing the soft magnetic properties will improve the magnetic stability of the heads or perhaps enhance the amplitude by decreasing the required hard bias stabilization. Therefore there is a need for a method of forming a head with enhanced soft magnetic properties along with improved dR.

SUMMARY OF THE INVENTION

The present invention overcomes the drawbacks and limitations described above by providing a method for forming a magnetic head having an improved PtMn layer. The method includes forming a PtMn layer using ion beam deposition. An antiparallel (AP) pinned layer structure is formed above the PtMn layer. A free layer is formed above the AP pinned layer structure. The AP pinned layer structure preferably includes at least two pinned layers having magnetic moments that are self-pinned antiparallel to each other, the pinned layers being separated by an AP coupling layer.

The present invention provides a spin valve structure having a new PtMn layer which improves the soft magnetic properties of the free layer as well as increases the dR/R of spin valve structures in which implemented. As mentioned above, soft magnetic properties of the spin valve structure are critical especially with thinner free layers. Enhancing the soft magnetic properties improves the magnetic stability of the heads and also enhances the amplitude by decreasing the required hard bias stabilization. Preferably, a dR of the head is at least 2% greater, and ideally at least 4% greater, than a dR of a substantially similar head having a PtMn layer formed by plasma vapor deposition. Also preferably, an easy axis coercivity (Hce) of the free layer is at least 5-15% less than an Hce of a free layer of a substantially similar head having a PtMn layer formed by plasma vapor deposition. Further, a hard axis coercivity (Hch) of the free layer is at least 10-20% less than an Hch of a free layer of a substantially similar head having a PtMn layer formed by plasma vapor deposition.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5-5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
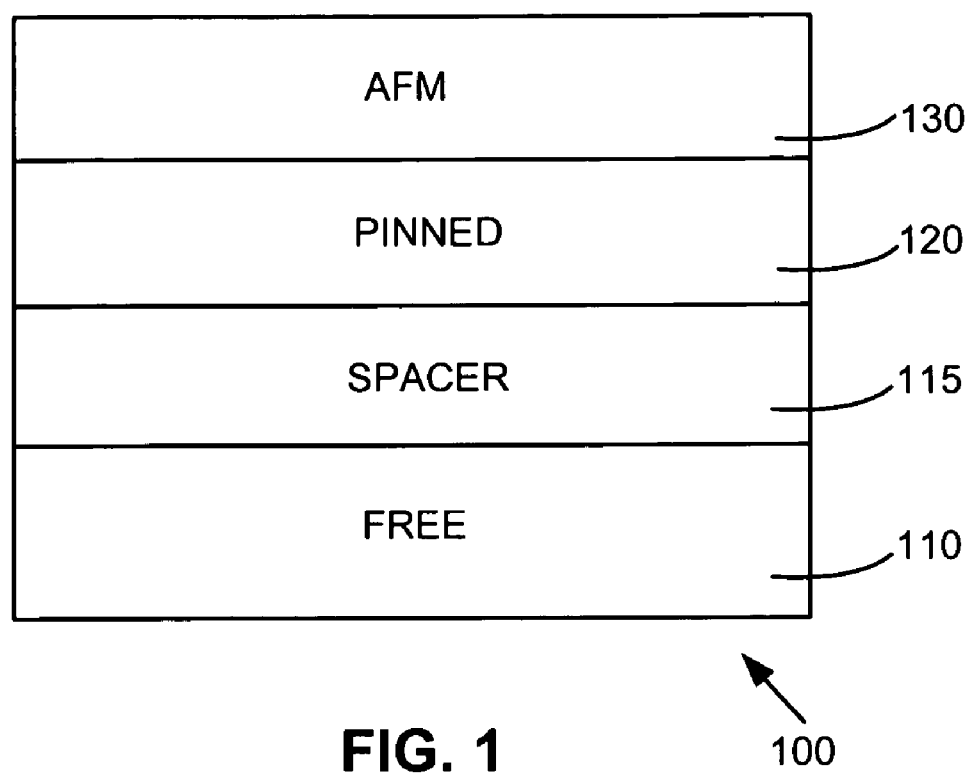
FIG. 1 is an air bearing surface view, not to scale, of a prior art spin valve (SV) sensor.
Figure 2A:
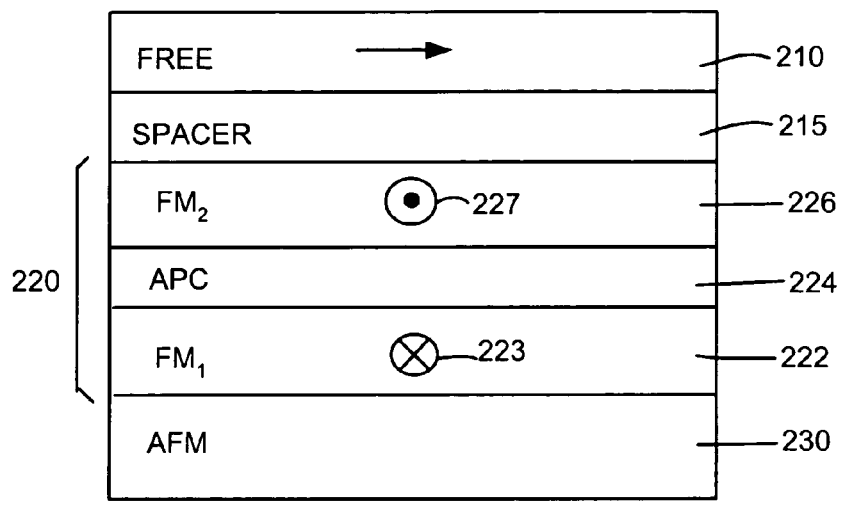
FIG. 2A is an air bearing surface view, not to scale, of a prior art AP-Pinned SV sensor.
Figure 2B:
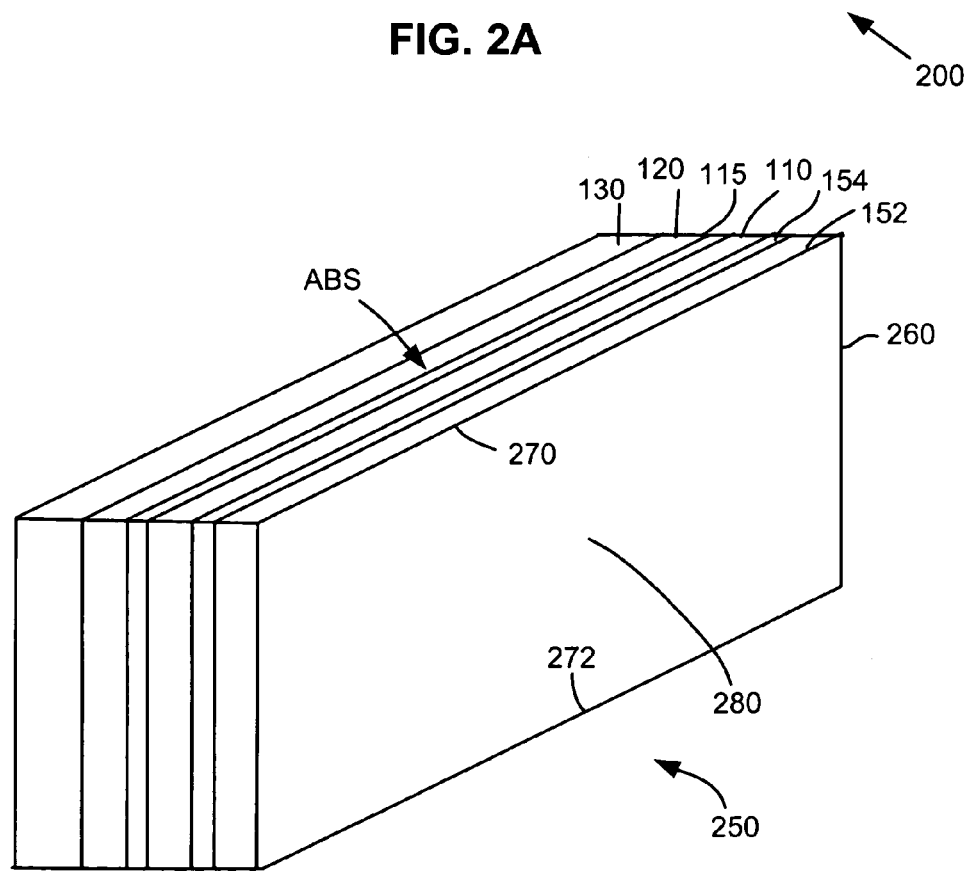
FIG. 2B is a perspective view, not to scale, of a prior art AP-Pinned SV sensor.
Figure 3:
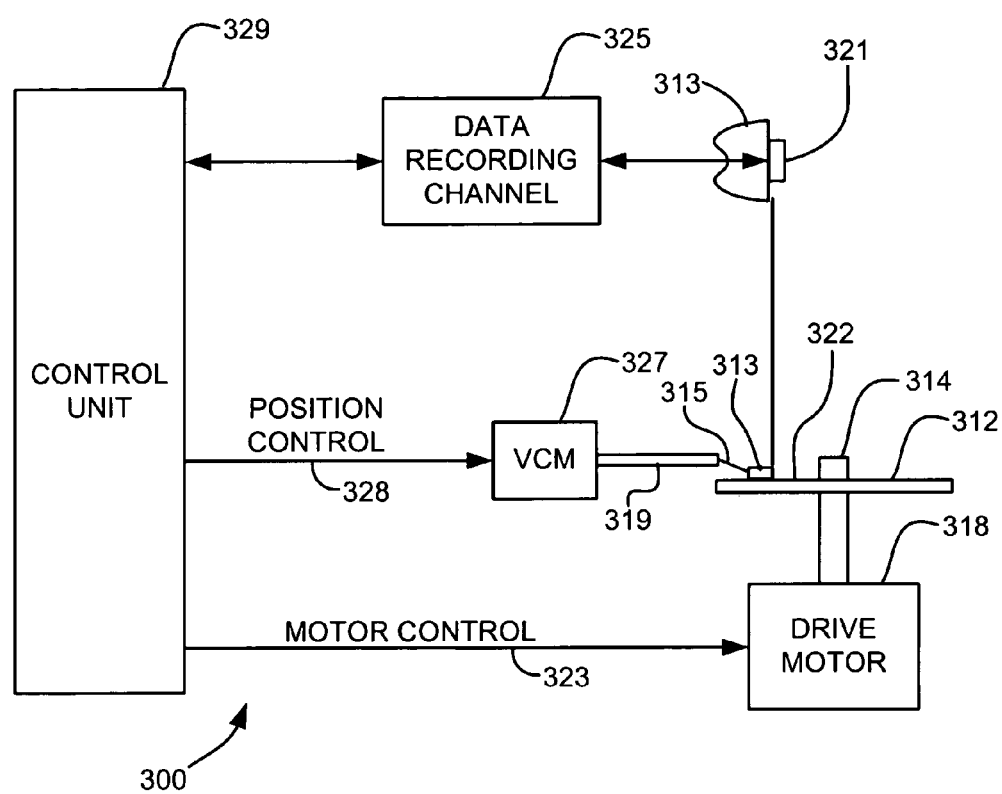
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
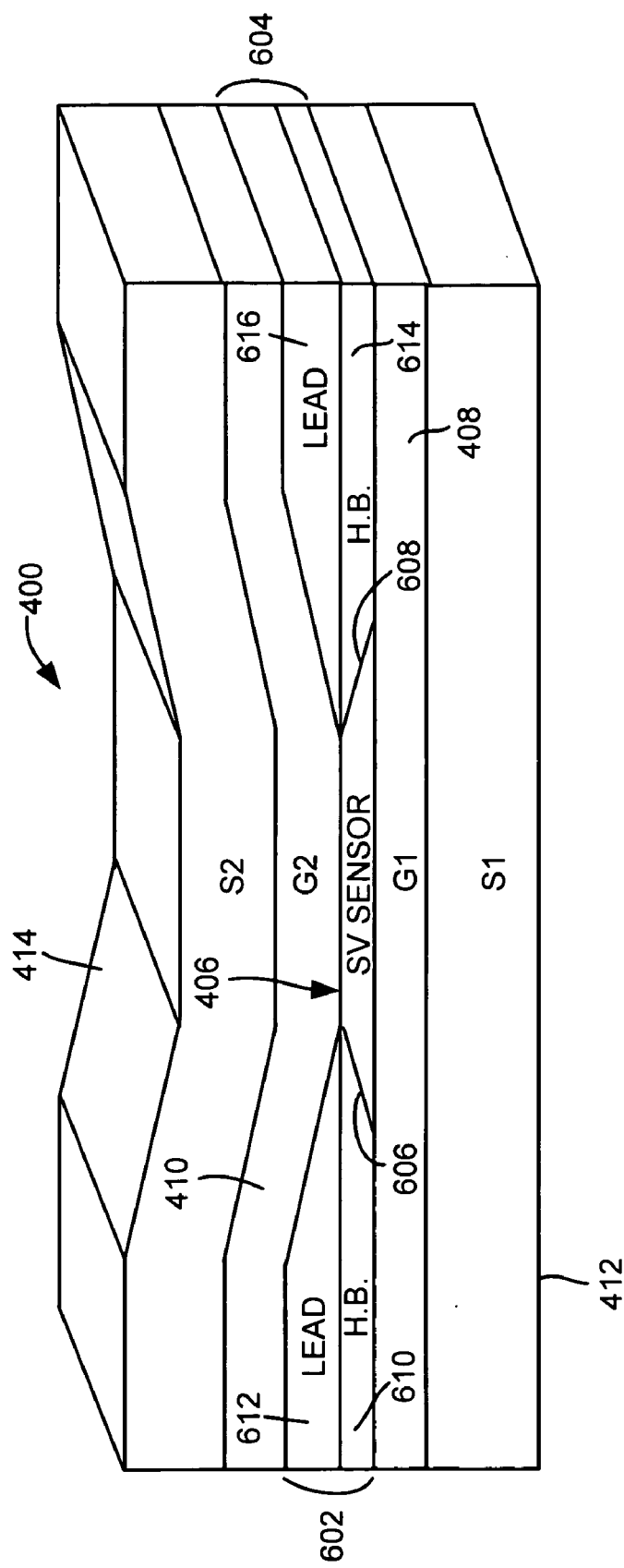
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides a spin valve structure having a new PtMn layer which improves the soft magnetic properties of the free layer as well as increases the dR/R of spin valve structures in which implemented. Soft magnetic properties of the spin valve structure are critical especially with thinner free layers. Enhancing the soft magnetic properties will improve the magnetic stability of the heads and also enhances the amplitude by decreasing the required hard bias stabilization.

Many types of heads can use the structures described herein, and the structures are particularly adapted to, CIP GMR sensors. "CIP" means that the sensing current ($I_s$) flows in a direction parallel to or "in" the plane of the layers forming the sensor.

In the following description, the width of the layers (W) refers to the track width. The sensor height is in a direction into the face of the paper. Unless otherwise described, thicknesses of the individual layers are taken perpendicular to the plane of the associated layer and are provided by way of example only and may be larger and/or smaller than those listed. Similarly, the materials listed herein are provided by way of example only, and one skilled in the art will understand that other materials may be used without straying from the spirit and scope of the present invention. Conventional processes can be used to form the structures except where otherwise noted.

Figure 7:
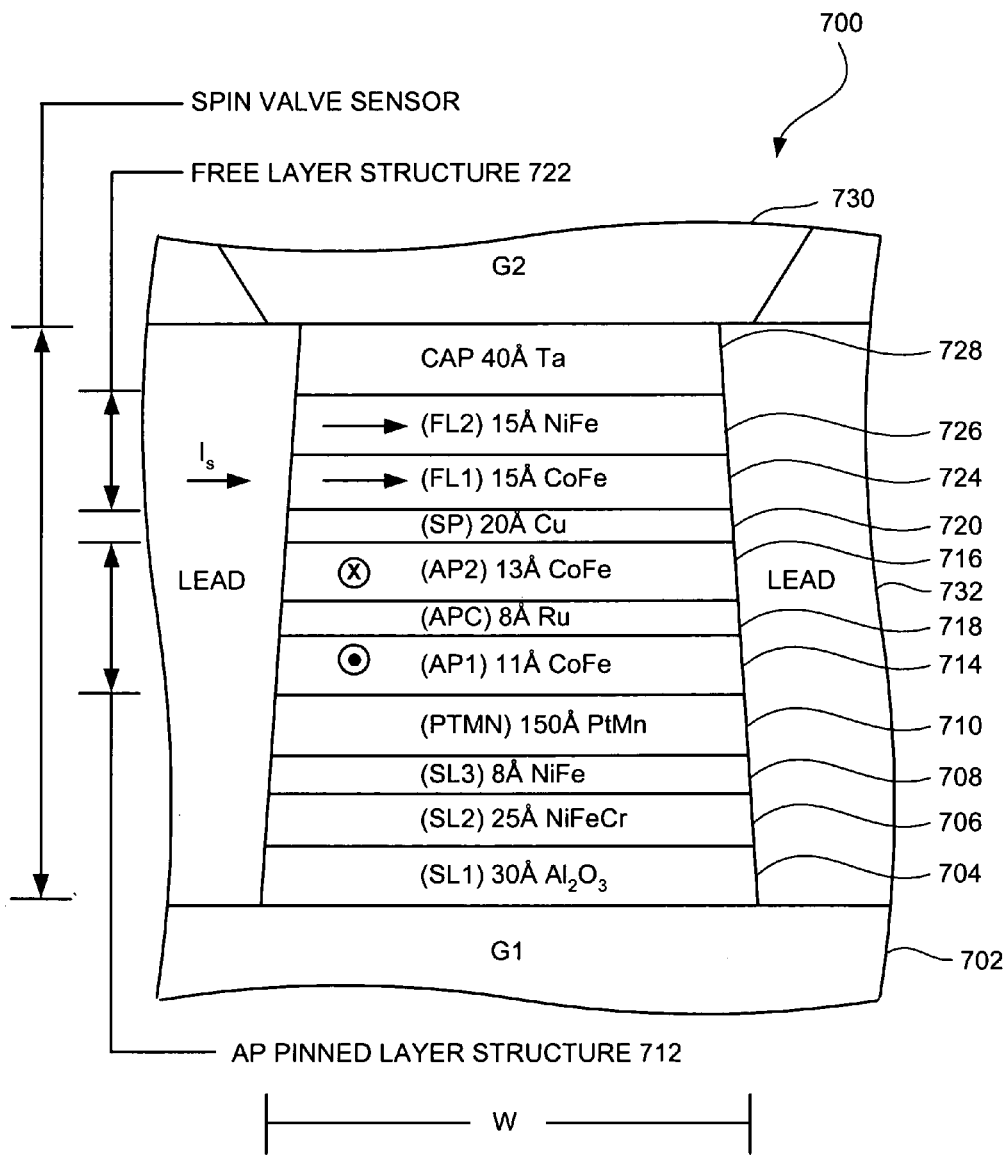
FIG. 7 is an ABS illustration of a CIP GMR sensor, not to scale, according to an embodiment of the present invention.

FIG. 7 depicts an ABS view of a CIP GMR sensor 700 according to one embodiment. The spin valve structure in this illustrative embodiment generally includes the following layers: $Al_2O_3$(30 Å)/NiFeCr(25 Å)/NiFe(8 Å)/PtMn(150 Å) /CoFe(11 Å)/Ru(8 Å)/CoFe(13 Å)/Cu(20 Å)/CoFe(15 Å)/NiFe(15 Å)/Ta(40 Å). Note that this structure is set forth to illustrate the general concepts described herein and one skilled in the art will understand that layers may be added and removed, and thicknesses and materials used may be varied.

As shown in FIG. 7, a first insulative layer (G1) 702 is formed on a substrate (not shown). The first insulative layer 702 can be of any suitable material, such as permalloy (NiFe).

Seed layers are formed on the first insulative layer 702. The seed layers aid in creating the proper growth structure of the layers above them. Illustrative materials formed in a stack from the first shield layer 702 are a layer of $Al_2O_3$ (SL1) 704, a layer of NiFeCr (SL2) 706, and a layer of NiFe (SL3) 708. Illustrative thicknesses of these materials are $Al_2O_3$ (30 Å), NiFeCr (25 Å), and NiFe (8 Å). Note that the stack of seed layers can be varied, and layers may be added or omitted based on the desired processing parameters.

A PtMn layer (PTMN) 710 is formed above the seed layers by ion beam deposition (IBD). The benefits of using IBD over the current state of the art process, i.e., plasma vapor deposition (PVD), are discussed in more detail below. Illustrative thicknesses of the PtMn layer 710 is about 25-200 Å.

Figure 8:
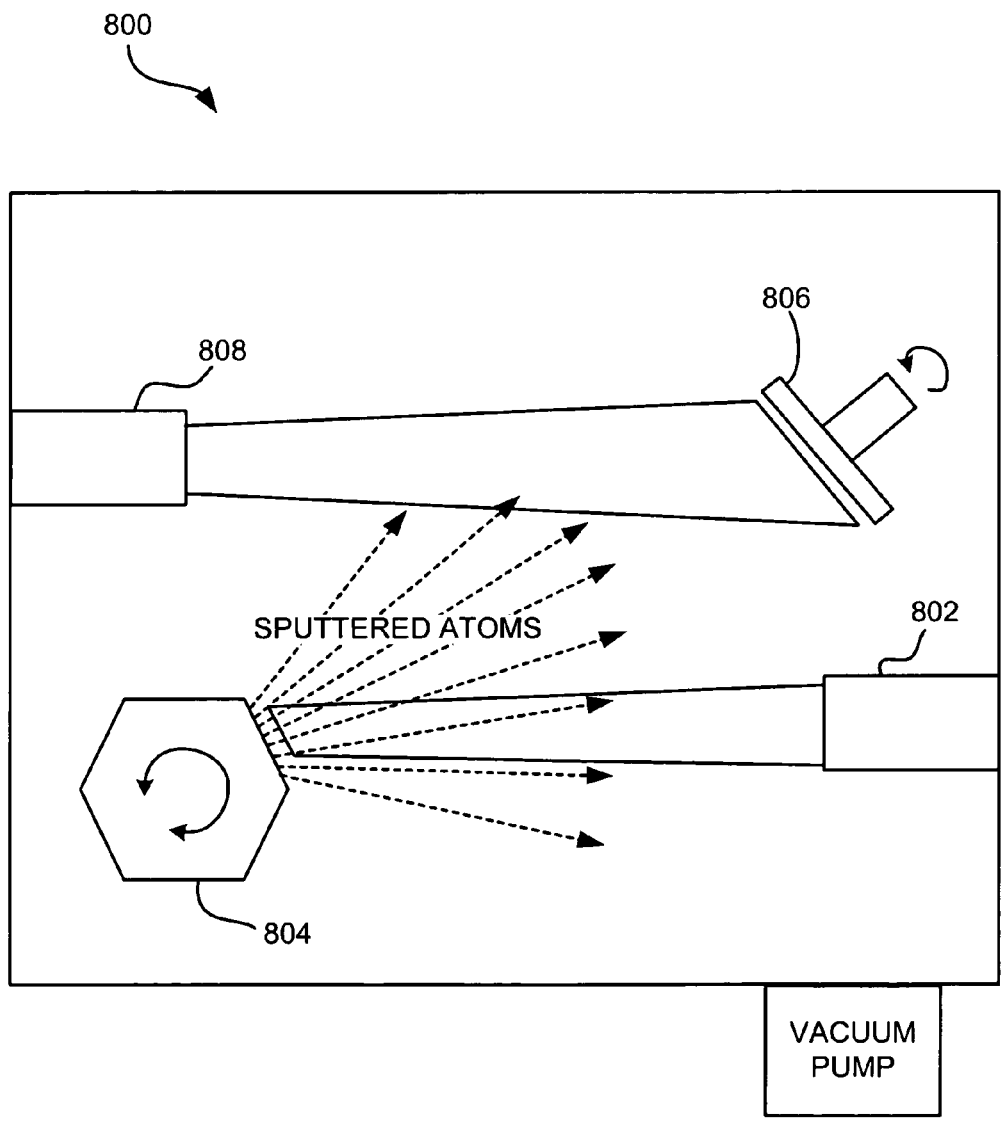
FIG. 8 is a system view of an ion beam deposition chamber.

FIG. 8 depicts an illustrative IBD system 800 that may be used to form the PtMn layer 710 and other layers in the sensor 700. As shown in FIG. 8, IBD uses an energetic, broad beam ion source 802 carefully focused on a grounded metallic or dielectric sputtering target 804. Material sputtered from the target 804 deposits on a nearby substrate 806 to create a film. A second ion source 808, an ion assist source (IAD), may also be directed at the substrate to deliver energetic noble or reactive ions at the surface of the growing film. IAD is particularly desirable when growing metal oxide and metal nitride films as it improves the stability, density, dielectric and optical properties of the films. The ion sources may be "gridded" ion sources of the Kaufman type, which are typically neutralized with an independent electron source. An assembly of multiple targets can be indexed into position to create multilayer thin film heads.

IBD processing yields excellent control and repeatability of film thickness and properties. Process pressures in the IBD system may be $\sim 10^{-4}$ Torr. Hence, there is very little scattering of either ions delivered by the ion sources or material sputtered from the target of the surface. Compared to sputter deposition using magnetron or diode systems, sputter deposition by IBD is highly directional and more energetic. In combination with a substrate fixture that rotates and changes angle, the IBD system delivers a broad range of control over sidewall coatings, trench filling and liftoff profiles.

Direct ion beam deposition can also be used to form the PtMn layer 710.

While not wishing to be bound by any particular theory, the inventors believe that the use of a denser and more crystalline IBD PtMn, along with its increased uniformity, facilitates an improved microstructure for the spin valve layers which results in improved soft magnetic properties, as indicated in Table 1. Soft magnetic properties of spin valve structures are critical especially with thinner free layers. Enhancing the soft magnetic properties improves the magnetic stability of the heads and also enhances the amplitude by decreasing the required hard bias stabilization. Improved dR is observed with the new structure as indicated in the following table.

TABLE 1

| Properties | PtMn in PVD | PtMn in IBD | Change (improvement) |
|---|---|---|---|
| R (Ω/square) | 22.6 | 23.6 | 4.4% |
| dR (Ω/square) | 2.94 | 3.04 | 3.4% |

TABLE 1-continued

| Properties | PtMn in PVD | PtMn in IBD | Change (improvement) |
|---|---|---|---|
| Hce (Oe.) | 4.58 | 3.89 | 15% |
| Hch (Oe.) | 1.65 | 1.33 | 20% |
| He (Oe.) | −17 | −10 | — |

As shown in Table 1, the resistance of the structure shown in FIG. 7 increases 4.4% and the dR (signal) is enhanced by 3.4% if IBD is used to form the PtMn layer 710 as opposed to PVD. Structures similar to that shown in FIG. 7 will show an enhancement of R and dR on the order of 2-4% or more over heads formed by conventional processes.

As also shown in Table 1, the soft magnetic properties of the free layer are also enhanced. The Hce (easy axis coercivity) is decreased by 15%, while the Hch (hard axis coercivity) is decreased by 20%. Structures similar to that shown in FIG. 7 will show a similar decrease in coercivity on the order of 10-20% or more over heads formed by conventional processes. Note that the smaller the coercivity is, the more stable the free layer is, and thus the sensor. Also note that He is the coupling field, presented to show that the parameters are valid.

With continued reference to FIG. 7, an antiparallel (AP) pinned layer structure 712 is formed above the PtMn layer 710. As shown in FIG. 7, first and second AP pinned magnetic layers, (AP1) and (AP2) 714, 716, are separated by a thin layer of an antiparallel coupling (APC) material 718 such that the magnetic moments of the AP pinned layers 714, 716 are antiparallel to each other. The pinned layers 714, 716 have a property known as magnetostriction. The magnetostriction of the pinned layers 714, 716 is very positive. The sensor 700 is also under compressive ABS stress. The combination of positive magnetostriction and compressive stress causes the pinned layers 714, 716 to develop a magnetic anisotropy that is in a perpendicular direction to the track width. The magnetic coupling through the Ru spacer causes the pinned layers 714, 716 to have antiparallel-oriented magnetizations.

Illustrative materials for the pinned layers 714, 716 are $CoFe_{10}$ (90% Co, 10% Fe), $CoFe_{50}$ (50% Co, 50% Fe), etc. separated by a Ru layer 718. Illustrative thicknesses of the first and second pinned layers 714, 716 are between about 10 Å and 25 Å. The Ru layer 718 can be about 3-15 Å. In the embodiment shown in FIG. 7, each of the pinned layers 714, 716 is about 11-13 Å with an Ru layer 718 therebetween of about 8 Å.

A spacer layer (SP) 720 is formed above the pinned layer structure 712. Illustrative materials for the spacer layer 720 include Cu, $CuO_x$, $Cu/CoFeO_x/Cu$ stack, etc. The first spacer layer 720 can be about 10-30 Å thick, preferably about 20 Å.

A free layer 722 is formed above the spacer layer 720. The magnetic moment of the free layer 722 is soft and so is susceptible to reorientation from external magnetic forces, such as those exerted by data on disk media. The relative motion of magnetic orientation of the free layer 722 when affected by data bits on disk media creates variations in the sensing current flowing through the sensor 700, thereby creating the signal. Exemplary materials for the free layer 722 are CoFe, NiFe, a CoFe/NiFe stack (FL1, FL2) 724, 726 as shown, etc. An illustrative thickness of the free layer 722 is about 10-40 Å.

The magnetic orientation of the free layer 722 must be preset during manufacture, otherwise the orientation will be unstable and could move around at random, resulting in a "scrambled" or noisy signal. This instability is a fundamental property of soft materials, making them susceptible to any external magnetic perturbations. Thus, the magnetic orientation of the free layer 722 should be stabilized so that when its magnetic orientation moves, it consistently moves around in a systematical manner rather than a random manner. The magnetic orientation of the free layer 722 should also be stabilized so that it is less susceptible to reorientation, i.e., reversing. The structure disclosed stabilizes the free layer 722.

A cap (CAP) 728 is formed above the free layer 722. Exemplary materials for the cap 728 are Ta, Ta/Ru stack, etc. An illustrative thickness of the cap 728 is 20-50 Å.

A second insulative layer (G2) 730 is formed above the cap 728. Leads 732 of conventional materials are formed on both sides of the sensor 700.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A method for forming a magnetic head having an improved PtMn layer, comprising:
   forming a PtMn layer using ion beam deposition;
   forming an antiparallel (AP) pinned layer structure above the PtMn layer;
   forming a spacer layer above the AP pinned layer structure;
   forming a free layer above the spacer;
   wherein the ion beam deposition comprises an ion assisted ion beam deposition performed using first and second ion sources, the first ion source being directed at a target and the second ion source being an ion assist source (IAD) directed at a substrate on which material from the target is to be deposited.

2. A method as recited in claim 1, wherein the AP pinned layer structure includes at least two pinned layers having magnetic moments that are antiparallel to each other, the pinned layers being separated by an AP coupling layer.

3. A method as recited in claim 1, wherein a signal (dR) of the head is at least 2% greater than a signal (dR) of a substantially similar head having a PtMn layer formed by plasma vapor deposition.

4. A method as recited in claim 1, wherein a signal (dR) of the head is at least 4% greater than a signal (dR) of a subsantially similar head having a PtMn layer formed by plasma vapor deposition.

5. A method as recited in claim 1, wherein an easy axis coercivity (Hce) of the free layer is at least 5% less than an easy axis coercivity (Hce) of a free layer of a substantially similar head having a PtMn layer formed by plasma vapor deposition.

6. A method as recited in claim 1, wherein an easy axis coercivity (Hce) of the free layer is at least 10% less than an easy axis coercivity (Hce) of a free layer of a substantially similar head having a PtMn layer formed by plasma vapor deposition.

7. A method as recited in claim 1, wherein an easy axis coercivity (Hce) of the free layer is at least 15% less than an easy axis coercivity (Hce) of a free layer of a substantially similar head having a PtMn layer formed by plasma vapor deposition.

8. A method as recited in claim 1, wherein a hard axis coercivity (Hch) of the free layer is at least 10% less than a hard axis coercivity (Hch) of a free layer of a substantially similar head having a PtMn layer formed by plasma vapor deposition.

9. A method as recited in claim 1, wherein a hard axis coercivity (Hch) of the free layer is at least 15% less than a hard axis coercivity (Hch) of a free layer of a substantially similar head having a PtMn layer formed by plasma vapor deposition.

10. A method as recited in claim 1, wherein a hard axis coercivity (Hch) of the free layer is at least 20% less than a hard axis coercivity (Hch) of a free layer of a substantially similar head having a PtMn layer formed by plasma vapor deposition.

11. A method as recited in claim 1, wherein each of the layers above the PtMn layer is formed by plasma vapor deposition.

12. A method as recited in claim 1, wherein the free layer is formed by plasma vapor deposition.

13. A method for forming a magnetic head having an improved PtMn layer, comprising:

forming seed layers;

forming a PtMn layer above the seed layers using ion beam deposition;

forming an antiparallel (AP) pinned layer structure above the PtMn layer;

forming a free layer above the AP pinned layer structure;

wherein the ion beam deposition comprises an ion assisted ion beam deposition performed using first and second ion sources, the first ion source being directed at a target and the second ion source being an ion assist source (IAD) directed at a substrate on which material from the target is to be deposited.

* * * * *

UNITED STATES PATENT AND TRADEMARK OFFICE
CERTIFICATE OF CORRECTION

| | | |
|---|---|---|
| PATENT NO. | : 7,270,854 B2 | Page 1 of 1 |
| APPLICATION NO. | : 10/717128 | |
| DATED | : September 18, 2007 | |
| INVENTOR(S) | : James Mac Freitag et al. | |

It is certified that error appears in the above-identified patent and that said Letters Patent is hereby corrected as shown below:

Col. 10, Line 54 replace "subsantially" with --substantially--

Signed and Sealed this

Eighteenth Day of May, 2010

David J. Kappos
*Director of the United States Patent and Trademark Office*